United States Patent
Grivas et al.

(10) Patent No.: US 9,092,101 B2
(45) Date of Patent: Jul. 28, 2015

(54) BATTERY CHARGING INTERRUPT

(75) Inventors: Chris J. Grivas, Crystal Lake, IL (US); Itisha C. Deokar, Buffalo Grove, IL (US); Steve A. Scherer, Sun Prairie, WI (US); Mark F. Valentine, Kenosha, WI (US)

(73) Assignee: Google Technology Holdings LLC, Mountain View, CA (US)

( * ) Notice: Subject to any disclaimer, the term of this patent is extended or adjusted under 35 U.S.C. 154(b) by 255 days.

(21) Appl. No.: 13/533,553

(22) Filed: Jun. 26, 2012

(65) Prior Publication Data
US 2013/0342171 A1 Dec. 26, 2013

(51) Int. Cl.
| | |
|---|---|
| G06F 3/041 | (2006.01) |
| H02J 7/00 | (2006.01) |
| G06F 3/044 | (2006.01) |
| G06F 3/0354 | (2013.01) |
| G06F 3/038 | (2013.01) |
| G06F 3/0488 | (2013.01) |

(52) U.S. Cl.
CPC .............. *G06F 3/044* (2013.01); *H02J 7/0031* (2013.01); *G06F 3/038* (2013.01); *G06F 3/03547* (2013.01); *G06F 3/0488* (2013.01); *Y02E 60/12* (2013.01)

(58) Field of Classification Search
CPC ..... G06F 3/0547; G06F 3/038; G06F 3/0488; Y02E 60/12
USPC .................................. 345/173; 320/127, 137
See application file for complete search history.

(56) References Cited

U.S. PATENT DOCUMENTS

| | | | | |
|---|---|---|---|---|
| 4,686,614 | A | * | 8/1987 | Costello ........................ 363/17 |
| 7,327,988 | B2 | * | 2/2008 | Grabon et al. ................. 455/73 |
| 7,567,240 | B2 | | 7/2009 | Peterson et al. |
| 7,808,211 | B2 | * | 10/2010 | Pacholok et al. ............ 320/140 |
| 8,049,469 | B2 | * | 11/2011 | Kim .............................. 320/153 |
| 8,330,426 | B2 | * | 12/2012 | Suzuki et al. ................ 320/157 |

(Continued)

FOREIGN PATENT DOCUMENTS

| | | |
|---|---|---|
| JP | 09-050347 A | 2/1997 |
| JP | 2006-211622 A | 8/2006 |
| JP | 2008-131812 A | 6/2008 |

OTHER PUBLICATIONS

Patent Cooperation Treaty, "PCT Search Report and Written Opinion of the International Searching Authority" for International Application No. PCT/US2013/042131, Sep. 13, 2013, 9 pages.

(Continued)

*Primary Examiner* — Stacy Whitmore
(74) *Attorney, Agent, or Firm* — Morris & Kamlay LLP

(57) ABSTRACT

In embodiments of battery charging interrupt, a device (102) includes a capacitive touch interface (104), a battery (110), and a charging circuit (108) that charges the battery when the device is coupled to a power supply (114). A touch detection system (106) detects a conductive contact on the capacitive touch interface of the device, and the touch detection system determines a level of noise on the capacitive touch interface. The level of noise may increase due to the conductive contact on the touch interface while charging the battery. A device controller (126) determines a charge level of the battery. The device controller can then interrupt charging the battery when the level of the noise exceeds a noise level threshold (128) and when the charge level of the battery exceeds a minimum charge level.

17 Claims, 5 Drawing Sheets

(56) References Cited

U.S. PATENT DOCUMENTS

| | | | |
|---|---|---|---|
| 8,489,666 B1* | 7/2013 | Nikitin | 708/819 |
| 8,576,189 B1* | 11/2013 | Maharyta et al. | 345/173 |
| 8,810,544 B2* | 8/2014 | Liu et al. | 345/174 |
| 2004/0053578 A1* | 3/2004 | Grabon et al. | 455/73 |
| 2006/0184705 A1* | 8/2006 | Nakajima | 710/303 |
| 2008/0024456 A1* | 1/2008 | Peng et al. | 345/173 |
| 2009/0100422 A1 | 4/2009 | Abe | |
| 2009/0200989 A1 | 8/2009 | Veselic et al. | |
| 2009/0206796 A1* | 8/2009 | Pacholok et al. | 320/145 |
| 2010/0085020 A1* | 4/2010 | Suzuki et al. | 320/157 |
| 2010/0097078 A1 | 4/2010 | Philipp et al. | |
| 2010/0207721 A1 | 8/2010 | Nakajima et al. | |
| 2010/0289759 A1* | 11/2010 | Fisher et al. | 345/173 |
| 2010/0302198 A1* | 12/2010 | Tasher et al. | 345/173 |
| 2011/0115729 A1* | 5/2011 | Kremin et al. | 345/173 |
| 2011/0157069 A1* | 6/2011 | Zhuang et al. | 345/174 |
| 2012/0049859 A1* | 3/2012 | Philipp et al. | 324/613 |
| 2012/0182252 A1* | 7/2012 | Brosnan et al. | 345/174 |
| 2013/0033451 A1* | 2/2013 | Olson | 345/174 |
| 2013/0093711 A1* | 4/2013 | Liu et al. | 345/174 |
| 2013/0141339 A1* | 6/2013 | Woolley et al. | 345/173 |
| 2013/0234978 A1* | 9/2013 | Ksondzyk | 345/174 |
| 2013/0249862 A1* | 9/2013 | Xu et al. | 345/174 |
| 2013/0297665 A1* | 11/2013 | Nikitin | 708/300 |
| 2013/0300690 A1* | 11/2013 | Yang et al. | 345/173 |
| 2013/0300692 A1* | 11/2013 | Jang et al. | 345/173 |
| 2013/0307569 A1* | 11/2013 | Philipp et al. | 324/686 |
| 2013/0335338 A1* | 12/2013 | Lai et al. | 345/173 |
| 2013/0339418 A1* | 12/2013 | Nikitin | 708/819 |
| 2014/0098048 A1* | 4/2014 | Park et al. | 345/173 |

OTHER PUBLICATIONS

Kannan Srinivasagam and Vibheesh B., "Differentiating noise from real touch: the key to robust capacitive sensing", EE Times, Oct. 25, 2010, 7 pages.

Murata Manufacturing Co. Ltd., "Differential and Common Mode Noise", Noise Suppression Techniques TE04EA-1, Mar. 20, 1998, pp. 26-30.

* cited by examiner

BATTERY CHARGING INTERRUPT

BACKGROUND

Many types of electronic devices have, such as mobile phones, handheld navigation devices, and portable media players, have an integrated, capacitive touch-screen for use as a display and user interface. When these types of devices are plugged-in to an AC power supply, such as to charge a battery of the device and/or to power the device, the AC power supply may generate common mode noise that causes display jitter and/or is sensed as a false touch input to the touch interface of the device. Capacitive touch interfaces are susceptible to electrical noise and other outside influences, which may cause erratic operation and inaccurate activations that can manifest as phantom or inaccurate touch inputs.

High common mode noise can be caused by a "noisy" AC/DC power supply or by other devices, such as a car dock that isolates an electronic device and creates a poor reference to ground. Other influences that can affect the performance of a capacitive touch interface are docking stations, car kits, HDMI and USB cables that are connected to a device, and other accessories that create an alternate or poor reference to ground. Many device manufacturers provide an AC/DC power supply (also commonly referred to as a wall adapter) that meets electronic device specifications to charge the battery of a device without introducing unwanted noise. For example, a manufacturer-provided AC/DC power supply may be designed for no more than a one (1) volt peak-to-peak maximum. When a user loses or misplaces the original equipment AC/DC power supply that is provided with a device, the user will typically replace the lost power supply with any one of many low-cost, aftermarket units that are available from any number of different sources. However, an aftermarket AC/DC power supply may allow as much as twenty-five (25) volt peak-to-peak common mode noise.

BRIEF DESCRIPTION OF THE DRAWINGS

Embodiments of battery charging interrupt are described with reference to the following drawings. The same numbers are used throughout the drawings to reference like features and components.

DETAILED DESCRIPTION

In embodiments of battery charging interrupt, a powered device includes a charging circuit that charges a battery of the device when a power supply (also commonly referred to as a wall adapter) couples the charging circuit to a power source. For example, a mobile phone can be plugged-in to an AC power source to charge the battery of the device and/or to power the device. As described above, a user may utilize a third-party or aftermarket, AC/DC power supply that can introduce unwanted noise when coupled to the device, rather than using a manufacturer-provided power supply that meets the electronic device specifications to charge the device battery without introducing the unwanted noise. Embodiments of battery charging interrupt balances the need to charge the battery of a device against the level of broadband noise that may be introduced when the device is coupled to a power supply that does not meet the electronic device manufacturer's specifications.

When a power supply is coupled to a device and a user contacts a capacitive touch interface of the device, the level of electrical noise (e.g., broadband noise, narrowband noise, or common mode noise) is determined and compared to a noise level threshold. The charge level of the battery can also be determined before a battery charging interrupt is initiated. When the level of common mode noise, for example, exceeds the noise level threshold and the charge level of the battery exceeds a minimum charge level, the battery charging can be interrupted to reduce the unwanted common mode noise. For example, the battery charging can be interrupted by isolating the charging circuit of the device from the power source. Charging the battery can be resumed when the user contact is lifted from the capacitive touch interface of the device. To minimize the impact on charging the battery, the battery charging is only disabled while there is user contact (e.g., a conductive contact) on the capacitive touch interface. This allows the signal-to-noise ratio to increase (by decreasing the noise during the user contact) and supports the touch detection system operating with greater reliability.

While features and concepts of the described battery charging interrupt can be implemented in any number of different devices, systems, and/or configurations, embodiments of battery charging interrupt are described in the context of the following example devices, systems, and methods.

Figure 1:
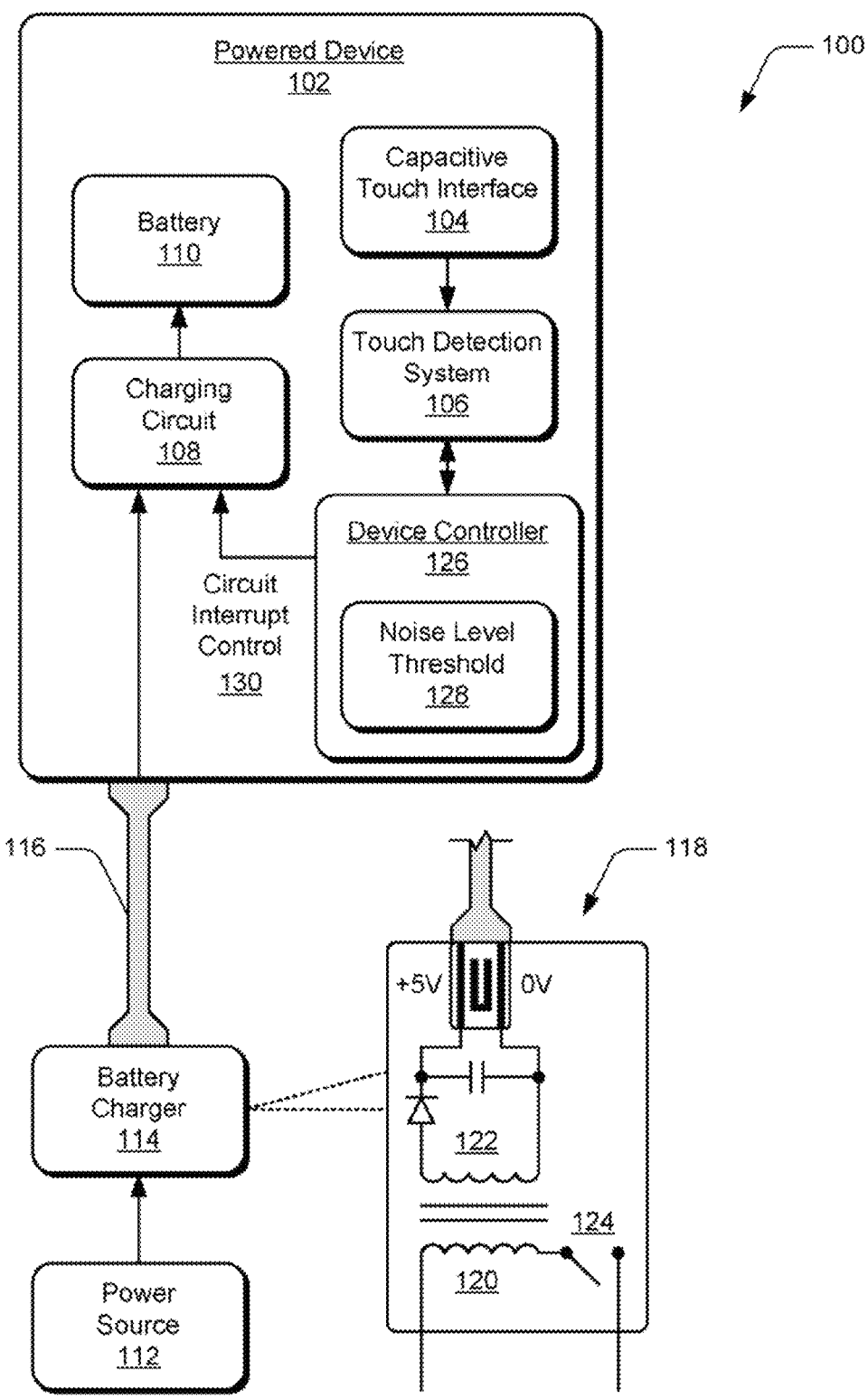
FIG. 1 illustrates an example system in which embodiments of battery charging interrupt can be implemented.

FIG. 1 illustrates an example system 100 in which embodiments of battery charging interrupt can be implemented. The example system 100 includes a powered device 102 that may be any type of portable electronic device, such as a mobile phone, handheld navigation device, portable gaming device, and/or portable media playback device. The powered device may also be any type of device as further described with reference to the example electronic device shown in FIG. 7. The powered device 102 includes a capacitive touch interface 104 (also referred to as a touch-screen) and includes a touch detection system 106 that detects a conductive contact on the touch interface, such as a user contact of an image that is displayed on the touch interface.

The powered device 102 includes a charging circuit 108 that charges a battery 110 of the device when the charging circuit is coupled to a power source 112, such as an electrical mains wall power source. In this example, a power supply 114 (e.g., a switched-mode AC-to-DC wall adapter) is plugged-in to the power source 112 (e.g., a 60 Hz AC power source), and the DC power from the power supply 114 is coupled to the charging circuit 108 of the device via a charger cable 116 to charge the battery 110 and/or to power the device. The charging circuit 108 may be integrated in a system-on-chip (SoC) with other components and/or logic of the device, or alternatively, may be implemented as a circuit of the power supply 114 that is external to the powered device 102.

An example implementation of the power supply 114 is shown at 118. The power supply includes a transformer having a transformer primary 120 that couples to the external power source 112 and a transformer secondary 122 that couples to the device charging circuit 108 via the charger cable 116. The power supply 114 also includes a switch 124 that opens and closes to regulate an output voltage based on device loading. As described above, a user may utilize a third-party or aftermarket, power supply (e.g., wall adapter) that can introduce unwanted noise when coupled to the device, rather than using a manufacturer-provided power supply that meets the electronic device manufacturer's specifications to charge the device battery without introducing the unwanted noise.

When the power supply 114 is coupled to the powered device 102, and a user contacts the capacitive touch interface 104, an increase in common mode noise may cause the touch detection system 106 to detect false or jittery touch signals. Broadband noise interferes with the touch interface when the magnitude of the electric field from the noise is comparable to the magnitude of the electric field produced by the touch interface's transmitters. In order to reduce the effect of noise on the touch interface, a detection threshold can be raised above the noise threshold while a conductive contact is detected. This detection threshold can rise and fall based on electrical measurements of untouched portions of the touch interface, and can provide an indication of the impact of the noise during detection of the conductive contact.

When the touch detection system 106 detects a user contact on the capacitive touch interface 104, the touch detection system also determines the level of noise on the capacitive touch interface. In some implementations, the touch detection system can detect common mode noise by detecting and measuring a signal component common to several nodes on the touch panel. However, when the power supply 114 is coupled to the powered device 102, common mode noise will likely be the dominant noise source and the level of the common mode noise can be attributed to the power supply.

In this example system, the powered device 102 also includes a device controller 126 that is implemented to determine whether the level of common mode noise exceeds a noise level threshold 128, and whether to interrupt the battery charging. The noise level threshold 128 can represent more than one type of electrical noise (e.g., broadband noise, narrowband noise at particular frequencies, common mode noise, etc.) and more than one level of noise. Various threshold values can be fixed values stored in a memory table or dynamically generated based on several factors, such as electrical noise measurements or the presence of conditions known to cause noise, such as a connection to a power supply, connection to an active HDMI monitor, and the like.

When the touch detection system 106 detects a conductive contact on the capacitive touch interface 104 while the power supply is coupled to the device, and the level of common mode noise during the contact is determined, the device controller 126 can then determine whether to interrupt the battery charging to reduce the level of common mode noise. The device controller can also initiate a circuit interrupt control 130 to interrupt the battery charging and/or to isolate the charging circuit 108 from the power supply 114.

In some embodiments, the device controller 126 can initiate the circuit interrupt control 130 to switch a circuit interrupt that is positioned between the charging circuit 108 and the power supply 114 to isolate the charging circuit 108 from the power supply 114 when the level of common mode noise exceeds the noise level threshold 128. In an implementation, both the high and low leads of the power supply 114 are isolated to disable the battery charging and prevent a ground loop through the low lead. An example of a software controlled charging circuit is described with reference to FIG. 3; an example of an electronically switched charging circuit is described with reference to FIG. 4; and an example of a switched charging circuit is described with reference to FIG. 5. In other embodiments, the device controller 126 can initiate the circuit interrupt control 130 to initiate a low-frequency, switched mode (or pulse-skipping mode) of the switched-mode power supply 114 to reduce the common mode noise. The circuit interrupt control 130 may also be implemented to reduce the input current drawn from the power supply 114 by the charging circuit in the mobile device.

In certain aspects, the device controller 126 is also implemented to determine a charge level of the battery 110 before interrupting the battery charging. For example, the device controller can determine whether the level of common mode noise exceeds the noise level threshold 128, and then determine a charge level of the battery when the level of common mode noise exceeds the noise level threshold. The device controller can then either increase the noise level threshold when the charge level of the battery is below a minimum charge level, or interrupt the battery charging when the level of common mode noise exceeds the noise level threshold and the charge level of the battery exceeds the minimum charge level.

In some embodiments, charging the battery 110 is resumed when the conductive contact is removed from the capacitive touch interface 104. To minimize the impact on charging the battery, the battery charging is only disabled while there is contact on the capacitive touch interface. The touch detection system 106 is implemented to detect that a conductive contact on the capacitive touch interface has ended, and then the device controller 126 again couples the charging circuit 108 to the power supply 114. In some implementations, the device controller can cancel the circuit interrupt control 130, initiate a circuit resume control, time-out the circuit interrupt, or initiate any other type of control to resume charging the battery. Additionally, a user interface notification may be displayed to indicate to a user that there is not an intermittent charging problem each time the capacitive touch interface is contacted and the battery charging interrupted.

Figure 2:
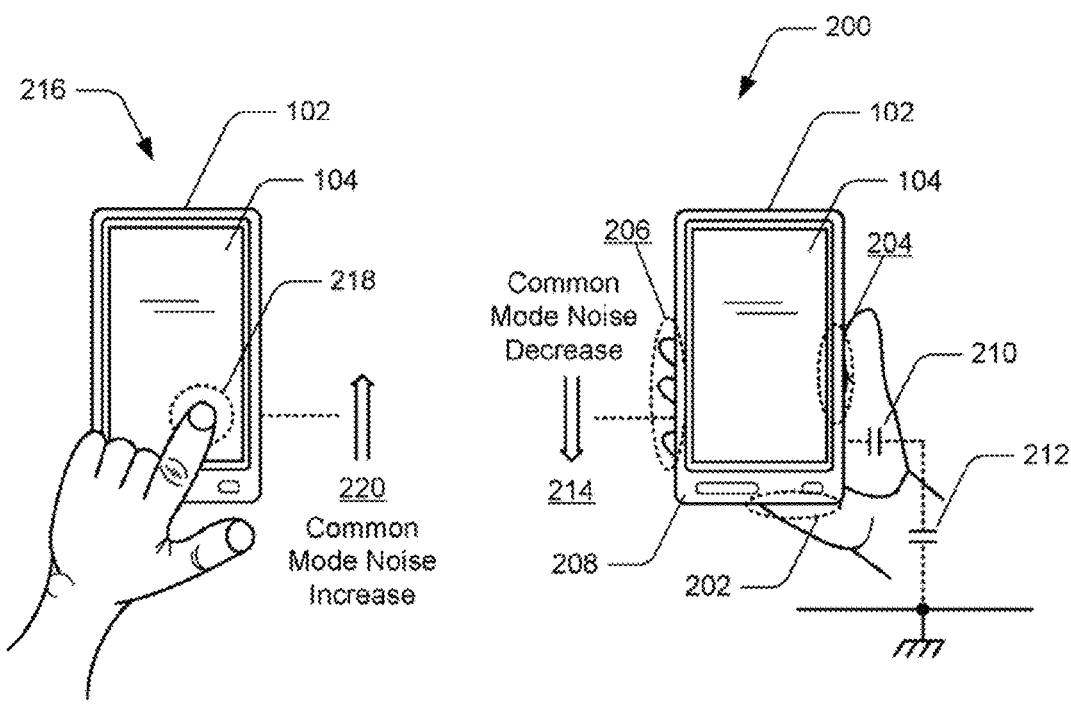
FIG. 2 illustrates an example powered device in which embodiments of battery charging interrupt can be implemented based on an increase and/or decrease of common mode noise.

FIG. 2 illustrates examples of the powered device 102 in which embodiments of battery charging interrupt can be implemented based on an increase and/or decrease of common mode noise. As shown in example 200, the powered device 102 includes the capacitive touch interface 104 and touch detection system 106 (shown in FIG. 1). When a user holds the device, user contact at 202, 204, and/or 206 with a chassis 208 of the device capacitively couples the device to ground, as represented by capacitors 210 and 212 in the illustration. If the chassis of the device is conductive then, either directly or indirectly (including inductively), it is likely to be coupled to the device charging circuit 108 (shown in FIG. 1).

When the device is capacitively coupled to ground, a high-frequency component of the common mode noise that may otherwise cause display jitter is shunted to ground. The capacitance between the device and ground is relatively large and the common mode noise, such as generated from the power supply, has little to no impact on the function of the capacitive touch interface of the device. Accordingly, the touch detection system 106 can determine a common mode noise decrease 214, and the device controller 126 can then decrease the noise level threshold 128. The chassis of a device may also be referred to as a housing portion, an outer casing, a shell, or other similar structures that define a form factor of the device and that a user contacts when holding the device.

In another example 216, a user may initiate contact with the capacitive touch interface 104 of the device 102 without holding the device in the other hand (such as shown in the other example 200) or generally, without contacting the chassis of the device, which would otherwise capacitively couple the device to ground. For example, a mobile phone with a capacitive touch interface may be plugged-in to a power source through a power supply and placed on a wooden desk or table. The user may then initiate contact on the device with one hand without picking up the device in the other hand. When a contact 218 is detected on the capacitive touch interface while a power supply couples the powered device to the power source, the touch detection system 106 can determine if a common mode noise increase 220 has occurred.

Figure 3:
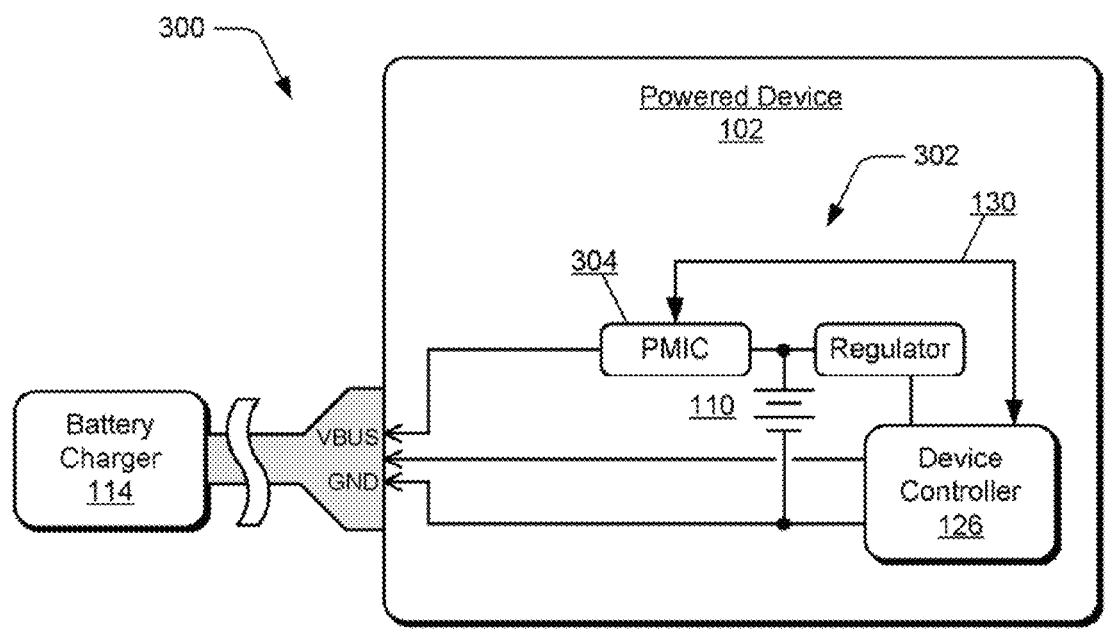
FIG. 3 illustrates a representation of a software controlled charging circuit implemented in an example powered device according to some embodiments of battery charging interrupt.

FIG. 3 illustrates a representation 300 of a software controlled charging circuit 302 that is implemented in the example powered device 102 and coupled to the power supply 114 to charge the battery 110 in embodiments of battery charging interrupt. The device controller 126 is implemented to initiate the circuit interrupt control 130 to a power management integrated circuit (PMIC) 304 to interrupt charging the battery by placing the switched-mode power supply that is coupled to the power source into a low-frequency, switched mode (or pulse-skipping mode), which reduces noise susceptibility of the capacitive touch interface 104 of the device.

Figure 4:
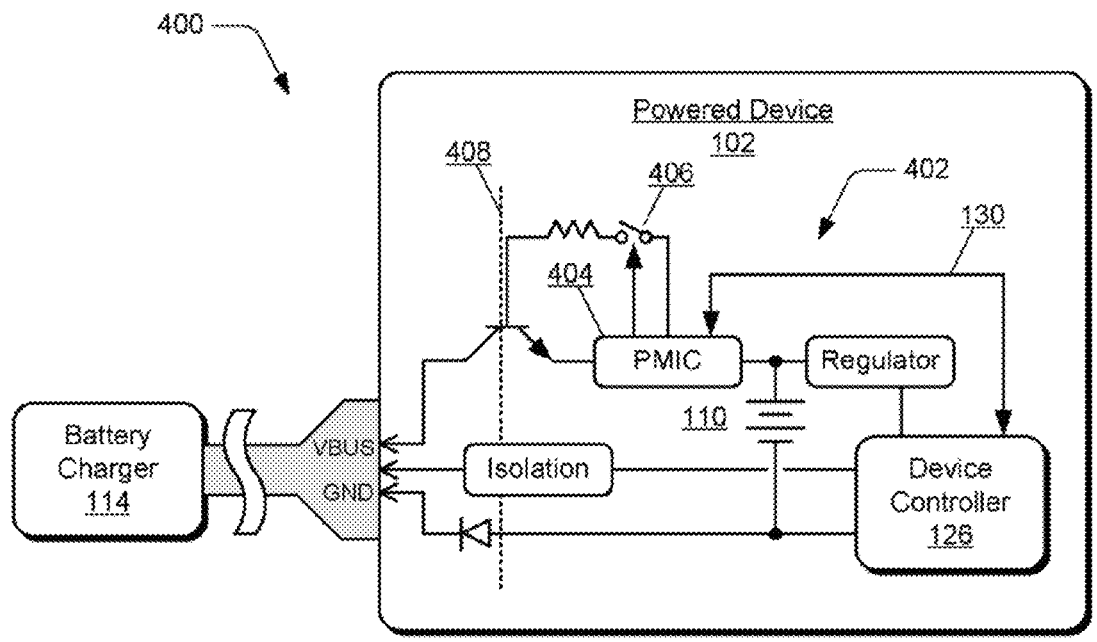
FIG. 4 illustrates a representation of an electronically switched charging circuit implemented in an example powered device in embodiments of battery charging interrupt.

FIG. 4 illustrates a representation 400 of an electronically switched charging circuit 402 that is implemented in the example powered device 102 and coupled to the power supply 114 to charge the battery 110 in embodiments of battery charging interrupt. The device controller 126 is implemented to initiate the circuit interrupt control 130 to a PMIC 404 that controls a switch 406 to interrupt charging the battery by isolating the charging circuit 402 from the power supply as represented by an isolation barrier 408 that also isolates data and other lines (e.g., USB lines D+ and D−).

Figure 5:
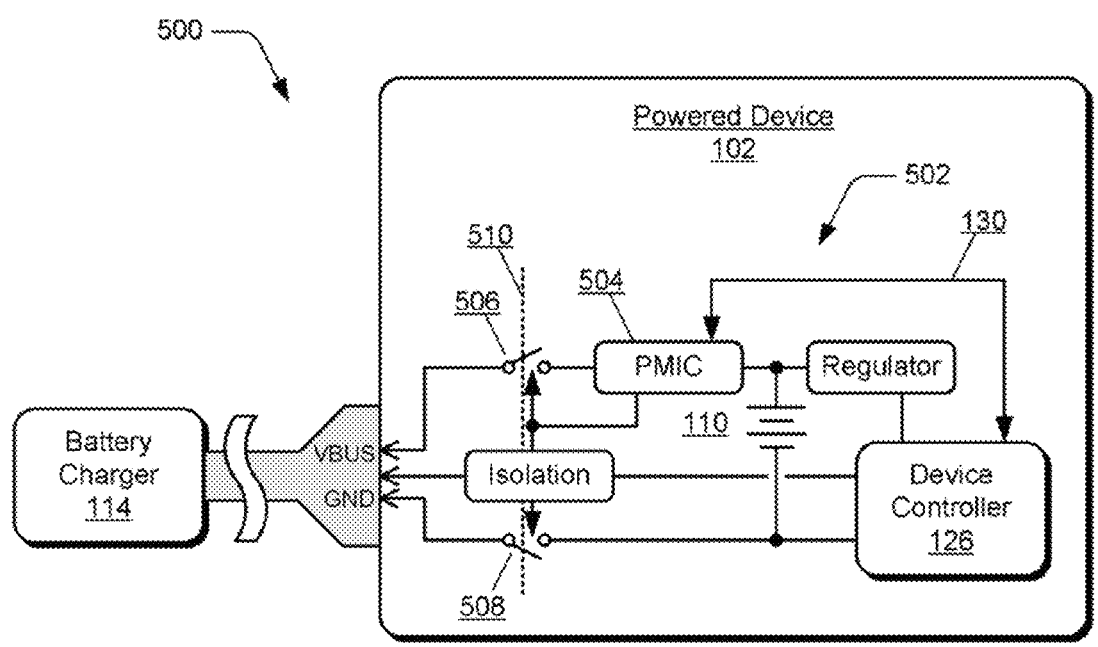
FIG. 5 illustrates a representation of a switched charging circuit implemented in an example powered device using embodiments of battery charging interrupt.

FIG. 5 illustrates a representation 500 of a switched charging circuit 502 that is implemented in the example powered device 102 and coupled to the power supply 114 to charge the battery 110 in embodiments of battery charging interrupt. The device controller 126 is implemented to initiate the circuit interrupt control 130 to a PMIC 504 that controls switches 506 and 508 to interrupt charging the battery by isolating the charging circuit 502 from the power supply as represented by an isolation barrier 510 that also isolates data and other lines (e.g., USB lines D+ and D−). In this example, a micro-electromechanical systems (MEMS) switching system is implemented, but other types of switching systems may be used.

Figure 6:
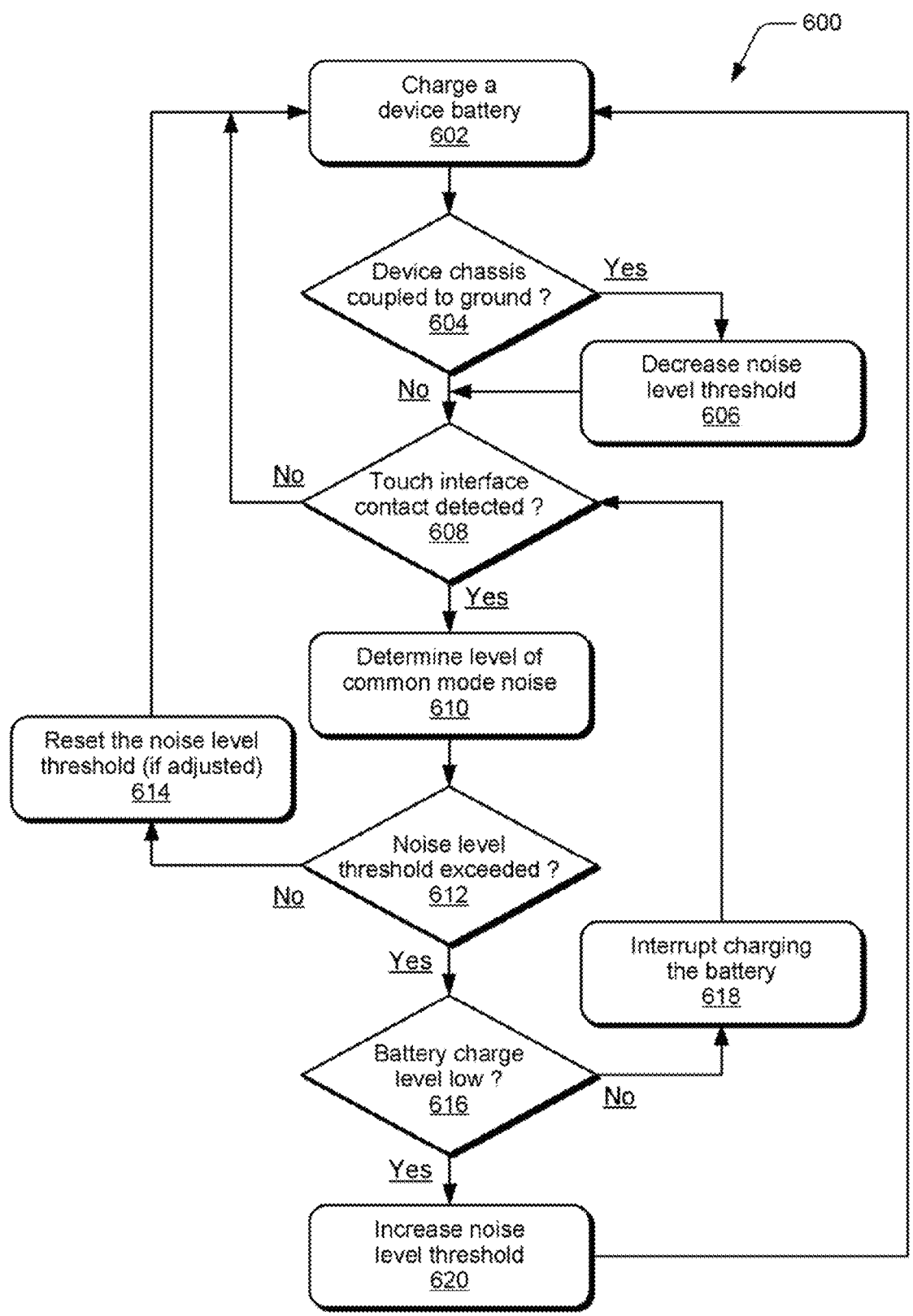
FIG. 6 illustrates example method(s) of battery charging interrupt in accordance with one or more embodiments.

FIG. 6 illustrates example method(s) 600 of battery charging interrupt. The order in which the method blocks are described are not intended to be construed as a limitation, and any number or combination of the described method blocks can be performed in any order to perform a method, or an alternate method for battery charging interrupt.

At block 602, a device battery is charged using a charging circuit that is coupled to a power source. For example, the power supply 114 (FIG. 1) couples the power source 112 to the charging circuit 108 of the powered device 102 to charge the device battery 110. Examples of the charging circuit 108 include the software controlled charging circuit 302 (FIG. 3), the electronically switched charging circuit 402 (FIG. 4), and the switched charging circuit 502 (FIG. 5)

At block 604, a determination is made as to whether a conductive chassis of the device is capacitively coupled to ground. For example, the touch detection system 106 of the powered device 102 can detect when the chassis 208 (FIG. 2) of the powered device 102 is capacitively coupled to ground, such as when a user holds the device making contact with the chassis. If the chassis of the device is capacitively coupled to ground (i.e., yes from block 604), then at block 606, the noise level threshold is decreased. For example, the device controller 126 decreases the noise level threshold 128 when the touch detection system 106 determines the common mode noise decrease 214 caused by grounding a conductive chassis of the electronic device. The effect of a lower noise level threshold is to make the touch detection system 106 more sensitive to smaller-surface-area contact. However, a lower noise level threshold also makes the touch detection system 106 more susceptible to false-positive "touches" caused by noise. Thus, lowering the noise level threshold when the device chassis is coupled to ground takes advantage of a circumstance where noise is less likely to create false positives.

Continuing from block 606, or if the chassis of the device is not capacitively coupled to ground (i.e., no from block 604), then at block 608, a determination is made as to whether a conductive contact is detected on the capacitive touch interface of the device. For example, the touch detection system 106 of the powered device 102 detects a user contact on the capacitive touch interface 104 of the device. If a conductive contact on the capacitive touch interface is not detected (i.e., no from block 608), then the method continues at block 602 to continue charging the device battery.

If a conductive contact on the capacitive touch interface is detected (i.e., yes from block 608), then at block 610, a level of noise is determined in response to detection of the contact. For example, the touch detection system 106 of the powered device 102 measures the level of noise, such as common mode noise, when the contact is detected on the capacitive touch interface 104 of the device.

At block 612, a determination is made as to whether the level of noise exceeds a noise level threshold. For example, the device controller 126 of the powered device 102 determines whether the level of noise exceeds the noise level threshold 128. If the noise level threshold is not exceeded (i.e., no from block 612), then at block 614, the noise level threshold is reset. For example, the device controller 126 sets the noise level threshold, or resets the noise level threshold if it was previously adjusted. The noise level threshold may be decreased as described with reference to block 606 above (i.e., when the device chassis is coupled to ground, which decreases the common mode noise); or the noise level threshold may be increased as described with reference to block 620 below (i.e., when the noise level threshold is exceeded and the battery charge level is low).

If the noise level threshold is exceeded (i.e., yes from block 612), then at block 616, a determination is made as to whether a charge level of the battery is low. For example, the device controller 126 of the powered device 102 determines whether the battery charge level is below a minimum charge level. If the charge level of the battery exceeds the minimum charge level (i.e., "no" from block 616), then at block 618, charging the battery is interrupted. For example, the device controller 126 interrupts the battery charging when the level of noise exceeds the noise level threshold 128 and when the charge level of the battery exceeds the minimum charge level.

In some embodiments, the device controller 126 of the powered device 102 interrupts the battery charging by switching a circuit interrupt between the charging circuit and the power source to isolate the charging circuit from the power source, or by initiating a low-frequency, switched mode (or pulse-skipping mode) of the power supply to interrupt charging the battery. For example, the device controller 126 initiates the circuit interrupt control 130 to the PMIC 304 (FIG.

3) to interrupt charging the battery by placing the power supply that is coupled to the power source in a low-frequency, switched mode (or pulse-skipping mode). In another example, the device controller 126 initiates the circuit interrupt control 130 to the PMIC 404 (FIG. 4) that controls the switch 406 to interrupt charging the battery by isolating the charging circuit 402 from the power supply 114. In another example, device controller 126 initiates the circuit interrupt control 130 to the PMIC 504 (FIG. 5) that controls switches 506 and 508 to interrupt charging the battery by isolating the charging circuit 502 from the power source.

Continuing from an interrupt of the battery charging at block 618, the method continues at block 608 to determine whether the contact is still detected on the capacitive touch interface of the device. For example, the touch detection system 106 of the powered device 102 detects that the contact on the capacitive touch interface 104 has ended. The device controller 126 then couples the charging circuit 108 to the power supply 114, and the method continues at block 602 to resume charging the device battery.

If the charge level of the battery is lower than the minimum charge level (i.e., "yes" from block 616), then at block 620, the noise level threshold is increased when the charge level of the battery is below the minimum charge level. The effect of a higher noise level threshold is to make the touch detection system 106 less sensitive to smaller-surface-area contact (i.e., a larger surface-area contact is needed before the touch detection system 106 registers a touch). However, a higher noise level threshold also makes the touch detection system 106 less susceptible to false-positive "touches" caused by noise. Thus, increasing the noise level threshold when the common mode noise is measured as high reduces false positives, which are more likely in a high noise environment. For example, the device controller 126 of the powered device 102 increases the noise level threshold 128, and the method continues at block 602 to continue charging the device battery.

Figure 7:
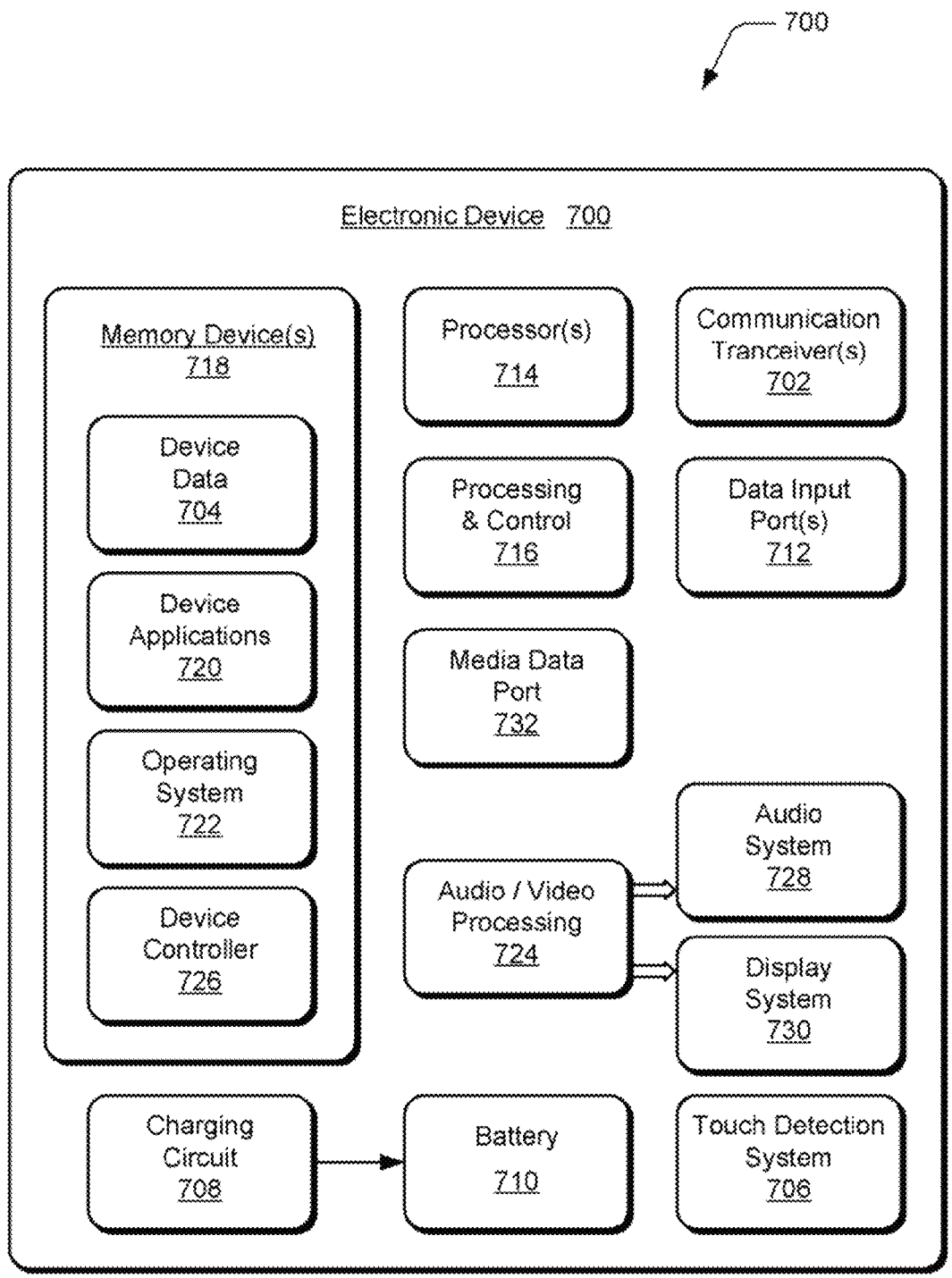
FIG. 7 illustrates various components of an example electronic device that can implement embodiments of battery charging interrupt.

FIG. 7 illustrates various components of an example electronic device 700 that can be implemented as a powered device as described with reference to any of the previous FIGS. 1-6. The device may be implemented as any one or combination of a fixed or mobile device, in any form of a consumer, computer, portable, user, communication, phone, navigation, gaming, messaging, Web browsing, paging, media playback, and/or other type of electronic device, such as the powered device 102 described with reference to FIG. 1.

The electronic device 700 includes communication transceivers 702 that enable wired and/or wireless communication of device data 704, such as received data and transmitted data. Example communication transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN, 3GPP-compliant) radios for cellular telephony, wireless metropolitan area network (WMAN) radios compliant with various IEEE 802.16 (WiMAX™) standards, and wired local area network (LAN) Ethernet transceivers.

In embodiments, the electronic device 700 includes a touch detection system 706, such as the touch detection system 106 described with reference to FIG. 1. The touch detection system is implemented to detect and/or sense conductive contacts, such as when initiated by a user as a selection input on the capacitive touch interface 104 that is integrated with the device. When implemented as a portable device, the electronic device 700 also includes a charging circuit 708, such as the charging circuit 108 described with reference to FIG. 1, that couples a battery 710 to an external power supply to charge the battery.

The electronic device 700 may also include one or more data input ports 712 via which any type of data, media content, and/or inputs can be received, such as user-selectable inputs, messages, music, television content, recorded video content, and any other type of audio, video, and/or image data received from any content and/or data source. The data input ports 712 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

The electronic device 700 of this example includes one or more processors 714 (e.g., any of microprocessors, controllers, and the like), or a processor and memory system (e.g., implemented in an SoC), which process computer-executable instructions to control operation of the device. Alternatively or in addition, the electronic device can be implemented with any one or combination of software, hardware, firmware, or fixed logic circuitry that is implemented in connection with processing and control circuits, which are generally identified at 716. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 700 also includes one or more memory devices 718 that enable data storage, examples of which include random access memory (RAM), non-volatile memory (e.g., read-only memory (ROM), flash memory, EPROM, EEPROM, etc.), and a disk storage device. A memory device 718 provides data storage mechanisms to store the device data 704, other types of information and/or data, and various device applications 720 (e.g., software applications). For example, an operating system 722 can be maintained as software instructions with a memory device and executed by the processors 714. In embodiments, the electronic device 700 includes a device controller 726, such as the device controller 126 described with reference to FIG. 1. Although represented as a software implementation, the device controller may be implemented as any form of a control application, software application, signal-processing and control module, firmware that is installed on the device, a hardware implementation of the controller, and so on.

The electronic device 700 also includes an audio and/or video processing system 724 that processes audio data and/or passes through the audio and video data to an audio system 728 and/or to a display system 730. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 732. In implementations, the audio system and/or the display system are external components to the electronic device. Alternatively or in addition, the display system can be an integrated component of the example electronic device, such as part of an integrated touch interface.

Although embodiments of battery charging interrupt have been described in language specific to features and/or methods, the subject of the appended claims is not necessarily limited to the specific features or methods described. Rather, the specific features and methods are disclosed as example implementations of battery charging interrupt.

The invention claimed is:

1. A method, comprising:
   charging a battery of a device using a charging circuit that is coupled to a power supply;
   detecting a conductive contact on a capacitive touch interface of the device;
   measuring it level of noise on the capacitive touch interface in response to detection of the conductive contact;
   determining whether the level of noise exceeds a noise level threshold; and
   interrupting the battery charging, by isolating the charging circuit from the power supply, when the level of noise adversely affects performance of the capacitive touch interface by exceeding the noise level threshold.

2. The method as recited in claim 1, wherein the isolating comprises:
   switching a circuit interrupt between the charging circuit and the power supply.

3. The method as recited in claim 1, wherein interrupting the battery charging comprises:
   initiating a low-frequency, switched mode of the power supply.

4. The method as recited in claim 1, further comprising:
   detecting that the conductive contact on the capacitive touch interface has ended; and
   resuming the battery charging.

5. The method as recited in claim 1, further comprising:
   determining a charge level of the battery; and
   isolating the charging circuit from the power supply when the level of noise exceeds the noise level threshold and when the charge level of the battery exceeds a minimum charge level.

6. The method as recited in claim 1, further comprising:
   determining a charge level of the batter; and
   increasing the noise level threshold when the charge level of the battery is below minimum charge level.

7. The method as recited in claim 1, further comprising:
   detecting that a conductive chassis of the device is capacitively coupled to ground; and
   decreasing the noise level threshold.

8. A device, comprising:
   a charging circuit configured to charge a battery of the device when coupled to a power supply;
   a touch detection system configured to detect a conductive contact on a capacitive tone interface of the device, the touch detection system further configured to determine a level of noise on the capacitive touch interface in response to detection of the conductive contact; and
   a device controller that:
      determines whether to interrupt the battery charging based at least in part on the level of noise and interrupts the charging circuit from the power supply only while the conductive contact is detected on the capacitive touch surface;
      determines whether the level of noise exceeds a noise level threshold; and
      isolates the charging circuit from the power supply when the level of noise exceeds the noise level threshold.

9. The device as recited in claim 8, further comprising:
   a circuit interrupt positioned between the charging circuit and the power supply; and wherein
   the device controller is configured to switch the circuit interrupt to isolate the charging circuit from the power supply.

10. The device as recited in claim 8, wherein the device controller is configured to initiate a low-frequency, switched mode of the power supply during the interrupt of the charging circuit.

11. The device as recited in claim 8, wherein:
    the touch detection system is configured to detect that the conductive contact on the capacitive touch interface has ended; and
    the device controller is configured to couple the charging circuit to the power supply.

12. The device as recited in claim 8, wherein the device controller is further configured to:
    determine a charge level of the battery; and
    isolate the charging circuit from the power supply when the level of noise exceeds a noise level threshold and when the charge level of the battery exceeds a minimum charge level.

13. The device as recited in claim 8, wherein the device controller is further configured to:
    determine whether the level of noise exceeds a noise level threshold;
    determine a charge level of the battery when the level of noise exceeds the noise level threshold; and
    increase the noise level threshold when the charge level of the battery is below a minimum charge level.

14. The device as recited in claim 8, wherein the touch detection system is configured to:
    detect that the level of noise is increased when the conductive contact is detected;
    determine whether the level of noise exceeds a noise level threshold; and
    isolate the charging circuit from the power supply when the level of noise exceeds the noise level threshold.

15. The device as recited in claim 14, wherein the touch detection system is configured to increase the noise level threshold when the conductive contact is detected.

16. The device as recited in claim 9, wherein the touch detection system is configured to:
    detect that a chassis of the device is capacitively coupled to ground; and
    decrease a noise level threshold.

17. A system, comprising:
    a device that includes a capacitive touch interface and charging circuit charges a battery of the device when coupled to a power source;
    a power supply configured to couple the power source to the charging circuit of the device to charge the battery; and
    a device controller that:
       initiates a low frequency, switched mode of the power supply based on a level of noise that is determined when a conductive contact on the capacitive touch interface is detected while the battery charges;
       determines whether the level noise exceeds a noise level threshold;
       determines a charge level of the battery; and
       isolates the charging circuit from the power supply when the level of noise exceeds the noise level threshold and when the charge level of the battery exceeds a minimum charge level.

* * * * *